(12) United States Patent
Fujii (10) Patent No.: US 11,085,496 B2
(45) Date of Patent: Aug. 10, 2021

(54) CLUTCH DEVICE

(71) Applicant: JTEKT Corporation, Osaka (JP)

(72) Inventor: Noriyuki Fujii, Hekinan (JP)

(73) Assignee: JTEKT Corporation, Osaka (JP)

( * ) Notice: Subject to any disclaimer, the term of this patent is extended or adjusted under 35 U.S.C. 154(b) by 12 days.

(21) Appl. No.: 16/702,671

(22) Filed: Dec. 4, 2019

(65) Prior Publication Data

US 2020/0182306 A1 Jun. 11, 2020

(30) Foreign Application Priority Data

Dec. 11, 2018 (JP) .............................. JP2018-231951

(51) Int. Cl.
| | |
|---|---|
| *F16D 13/52* | (2006.01) |
| *F16D 13/75* | (2006.01) |
| *F16D 21/06* | (2006.01) |
| *F16D 25/08* | (2006.01) |
| *F16D 13/64* | (2006.01) |
| *F16D 25/10* | (2006.01) |

(Continued)

(52) U.S. Cl.
CPC ......... *F16D 25/083* (2013.01); *F16D 13/646* (2013.01); *F16D 13/648* (2013.01); *F16D 25/086* (2013.01); *F16D 25/10* (2013.01); *F16D 13/74* (2013.01); *F16D 25/082* (2013.01); *F16D 25/12* (2013.01); *F16D 2013/642* (2013.01); *F16D 2125/06* (2013.01); *F16D 2250/0084* (2013.01)

(58) Field of Classification Search
CPC ....... F16D 25/082–087; F16D 25/0638; F16D 13/70; F16D 13/648; F16D 215/06; F16H 25/12; F16H 25/10
See application file for complete search history.

(56) References Cited

U.S. PATENT DOCUMENTS

| | | | | |
|---|---|---|---|---|
| 5,014,841 | A * | 5/1991 | Gillespie | ............... F16D 25/082 |
| | | | | 192/103 A |
| 2006/0090643 | A1* | 5/2006 | Onishi | ................ F16D 25/0638 |
| | | | | 92/255 |

(Continued)

FOREIGN PATENT DOCUMENTS

| | | | | |
|---|---|---|---|---|
| EP | 1288517 A1 * | 3/2003 | ............. | F16D 25/12 |
| JP | 2010-151312 A | 7/2010 | | |

(Continued)

*Primary Examiner* — Charles A Fox
*Assistant Examiner* — Farhana Pervin
(74) *Attorney, Agent, or Firm* — Oblon, McClelland, Maier & Neustadt, L.L.P.

(57) ABSTRACT

A clutch device includes a clutch housing including a cylindrical portion and a bottom, a multiple disc clutch, a receiving member and a pressing member that moves in an axial direction with respect to the clutch housing to press the multiple disc clutch from the bottom side toward the receiving member. The pressing member includes an annular portion disposed radially inward or outward of the bottom and a plurality of protruding portions protruding in a radial direction from the annular portion, the annular portion being provided integrally with the protruding portions. The bottom of the clutch housing has a plurality of cutouts that accommodate the protruding portions. The protruding portions move in the axial direction within the cutouts to press the multiple disc clutch.

6 Claims, 7 Drawing Sheets

(51) Int. Cl.
*F16D 13/74* (2006.01)
*F16D 125/06* (2012.01)
*F16D 25/12* (2006.01)

(56) References Cited

U.S. PATENT DOCUMENTS

| | | |
|---|---|---|
| 2011/0220451 A1 | 9/2011 | Kuwahara et al. |
| 2014/0069763 A1* | 3/2014 | Heitzenrater ........... F16D 23/14 |
| | | 192/66.31 |
| 2020/0149596 A1* | 5/2020 | Caumartin .............. F16D 21/06 |

FOREIGN PATENT DOCUMENTS

| | | | | |
|---|---|---|---|---|
| WO | WO-2014183757 A1 * | 11/2014 | ........... | F16D 13/385 |
| WO | WO-2017012618 A1 * | 1/2017 | ........... | F16D 13/683 |

* cited by examiner

CLUTCH DEVICE

INCORPORATION BY REFERENCE

The disclosure of Japanese Patent Application No. 2018-231951 filed on Dec. 11, 2018 including the specification, drawings and abstract is incorporated herein by reference in its entirety.

BACKGROUND

1. Technical Field

The disclosure relates to clutch devices having a plurality of clutch plates accommodated in a clutch housing.

2. Description of Related Art

Clutch devices having a plurality of clutch plates accommodated in a bottomed cylindrical clutch housing are conventionally used to transmit, for example, a driving force for a vehicle such that transmission of the driving force can be permitted and cut off as necessary (see, for example, Japanese Unexamined Patent Application Publication No. 2010-151312 (JP 2010-151312 A)).

In the clutch device described in JP 2010-151312 A, a multiple disc clutch comprised of a plurality of clutch plates is accommodated in a cylindrical portion of a bottomed cylindrical clutch housing. The clutch housing has a plurality of piston holes in its bottom. The multiple disc clutch is pressed by a piston having standing portions that move in an axial direction within the piston holes. The clutch plates are thus brought into frictional contact with each other.

The piston includes an annular body and the cylindrical standing portions provided at a plurality of positions in the circumferential direction so as to stand from the annular body. The annular body has standing-portion attachment holes and a ring groove that opens to the standing-portion attachment holes. Each standing portion has an insertion portion that is inserted in the standing-portion attachment hole and a cutout that is located at the same position as the ring groove when the insertion portion is inserted in the standing-portion attachment hole. The standing portions are attached to the annular body by inserting the standing portions into the standing-portion attachment holes and placing a snap ring into the ring groove.

SUMMARY

The clutch device configured as described above requires a large number of man-hours for machining of each part of the piston and assembling. This causes an increase in cost of the clutch device.

The inventors found that, with improvement in configuration of a pressing member that presses a multiple disc clutch, the pressing member can be easily produced and the cost of a clutch device can be reduced, and arrived at the disclosure based on the finding. That is, the disclosure provides a clutch device capable of achieving reduction in cost.

A clutch device according to an aspect of the disclosure includes a clutch housing including a cylindrical portion and a bottom extending inward in a radial direction from one end of the cylindrical portion, a multiple disc clutch including a plurality of clutch plates accommodated in the cylindrical portion, a receiving member attached to an open end of the clutch housing, and a pressing member that moves in an axial direction with respect to the clutch housing to press the multiple disc clutch from the bottom side toward the receiving member. The pressing member includes an annular portion disposed radially inward or outward of the bottom and a plurality of protruding portions protruding in the radial direction from the annular portion, the annular portion being provided integrally with the protruding portions. The bottom of the clutch housing includes a plurality of cutouts that accommodate the protruding portions. The protruding portions move in the axial direction within the cutouts to press the multiple disc clutch.

The above configuration reduces cost.

In the above aspect, the annular portion may be disposed radially outward of the bottom of the clutch housing, the protruding portions may protrude inward in the radial direction from the annular portion, and the cutouts may be provided in an outer peripheral end of the bottom and an end on the bottom side of the cylindrical portion.

In the above aspect, the annular portion may be disposed radially inward of the bottom of the clutch housing, the protruding portions may protrude outward in the radial direction from the annular portion, and the cutouts may be provided in an inner peripheral end of the bottom.

In the above aspect, the pressing member may have a flat plate shape and may include the annular portion and the protruding portions provided such that a thickness of the annular portion and a thickness of each of the protruding portions are equal to each other and the annular portion and the protruding portions constitute an integral unit.

In the above aspect, the pressing member may include a plurality of plate members stacked in the axial direction.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

An embodiment of the disclosure will be described with reference to FIGS. 1 to 4. The embodiment described below illustrates a suitable specific example for carrying out the disclosure. Although the embodiment described below specifically illustrates technically preferable various technical matters, the technical scope of the disclosure is not limited to this specific form.

Figure 1:
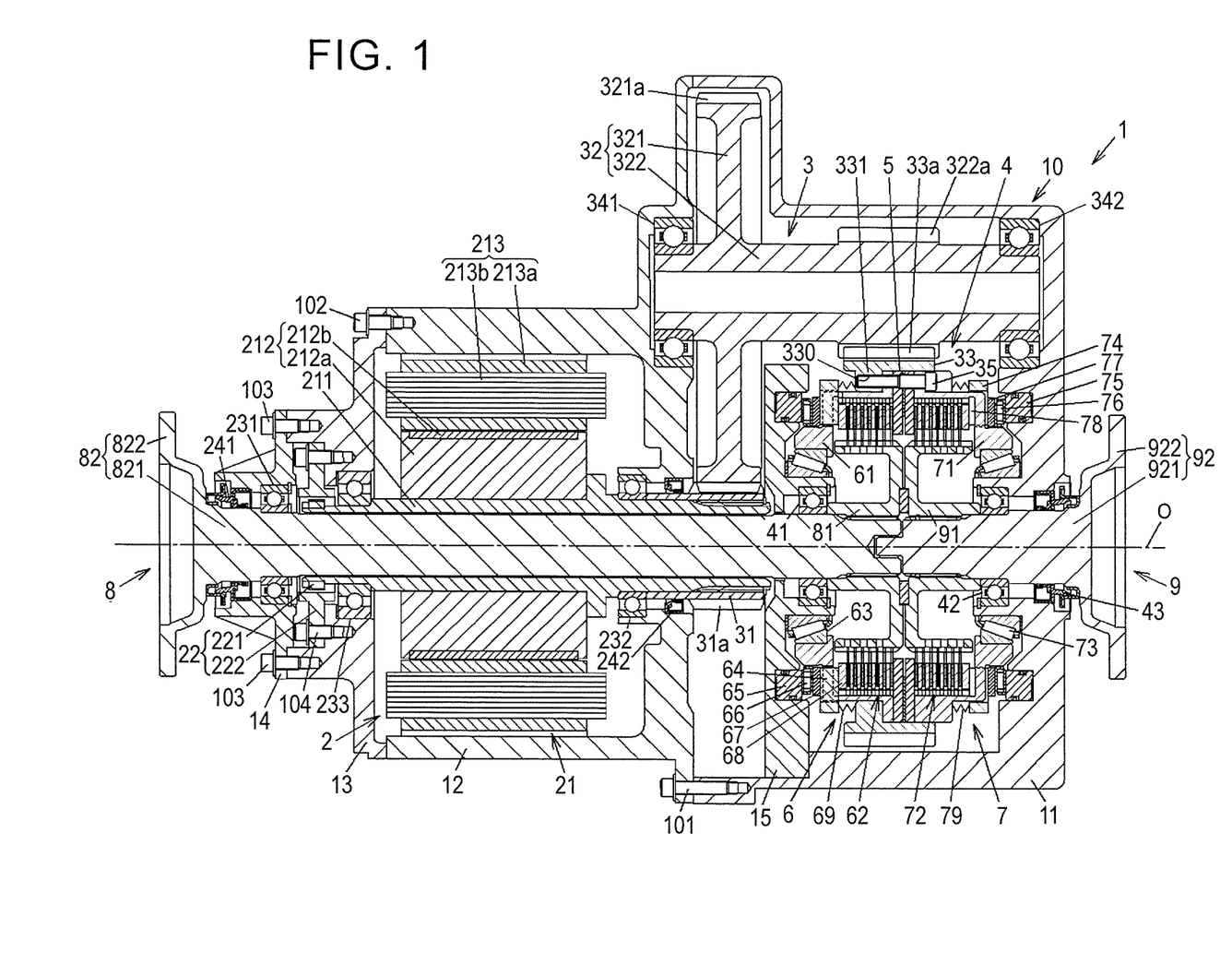
FIG. 1 is a sectional view showing a configuration example of a vehicle drive device including a clutch device according to a first embodiment of the disclosure.
Figure 2:
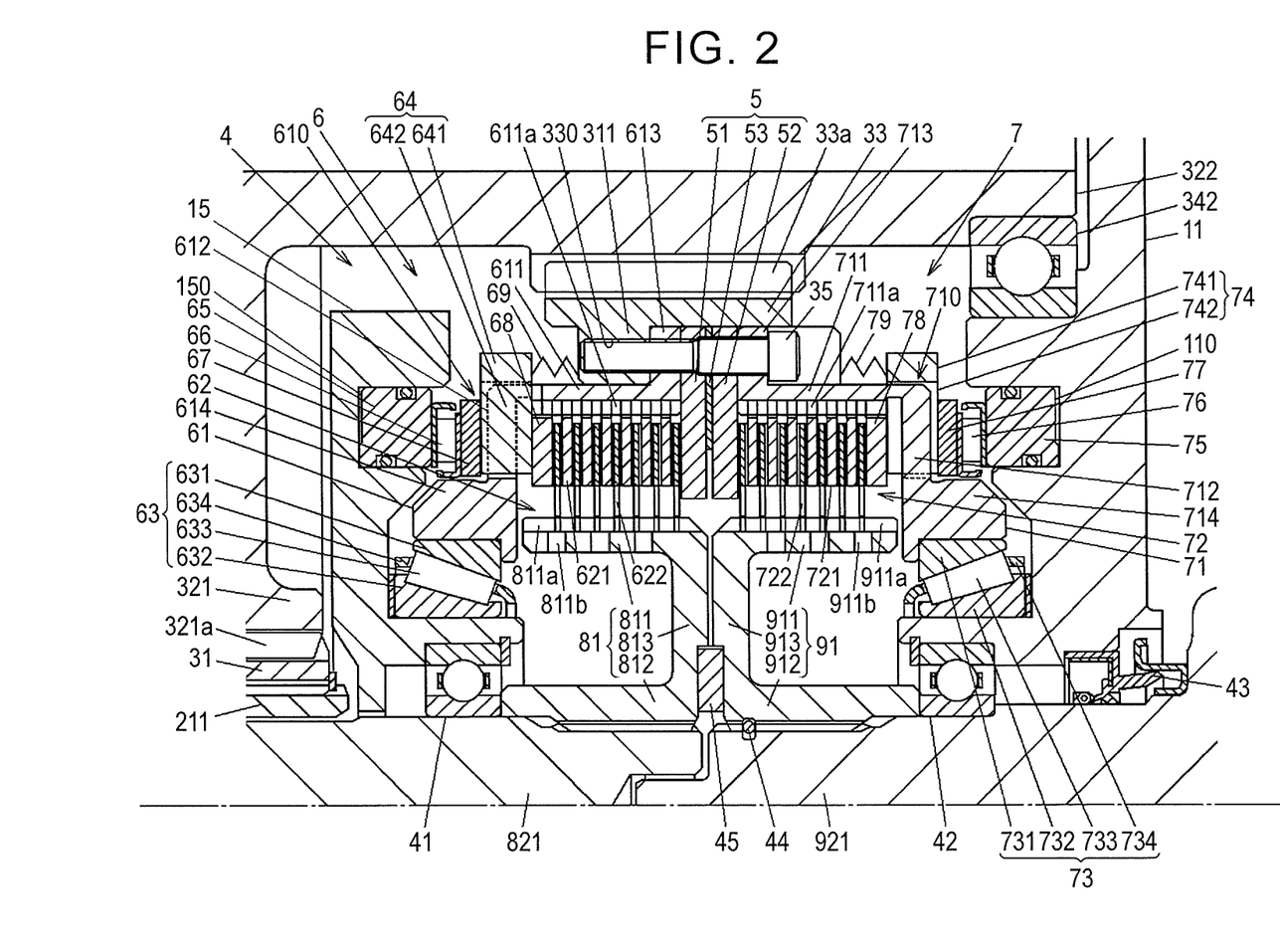
FIG. 2 is a partial enlarged sectional view of the vehicle drive device.
Figure 3A:
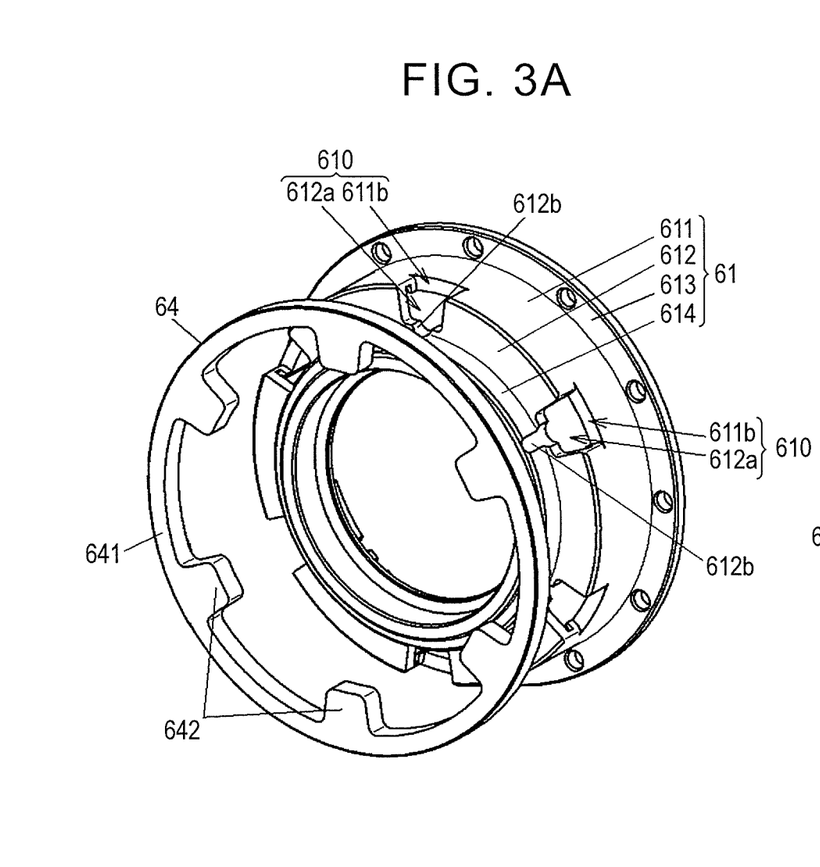
FIG. 3A is a perspective view of a first clutch housing and a first pressing member that are separated in an axial direction.
Figure 3B:
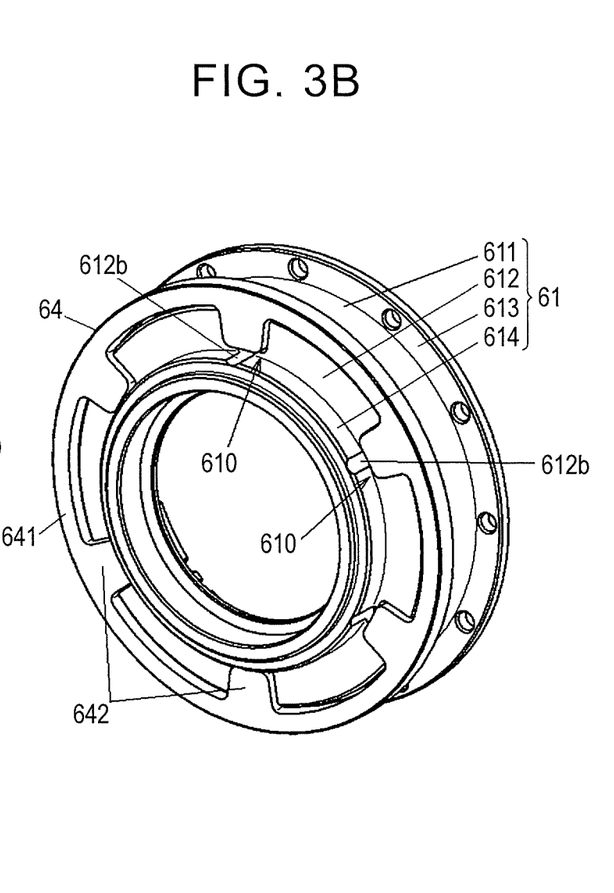
FIG. 3B is a perspective view of the first clutch housing and the first pressing member that are combined together.
Figure 4A:
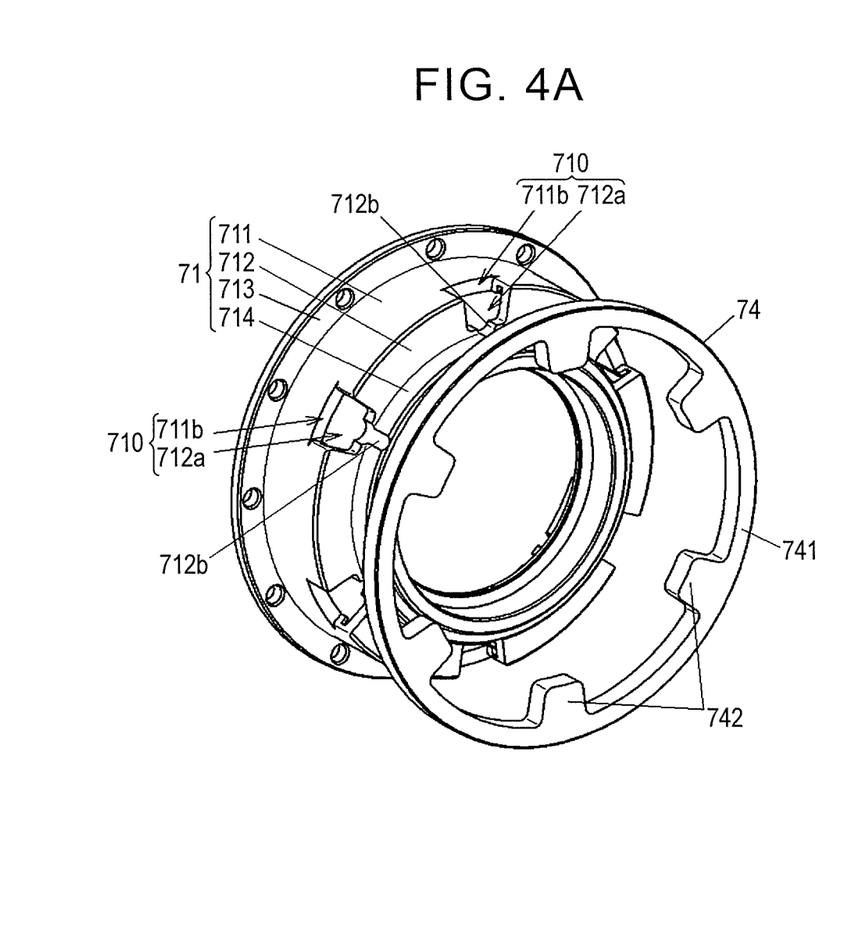
FIG. 4A is a perspective view of a second clutch housing and a second pressing member that are separated in the axial direction.
Figure 4B:
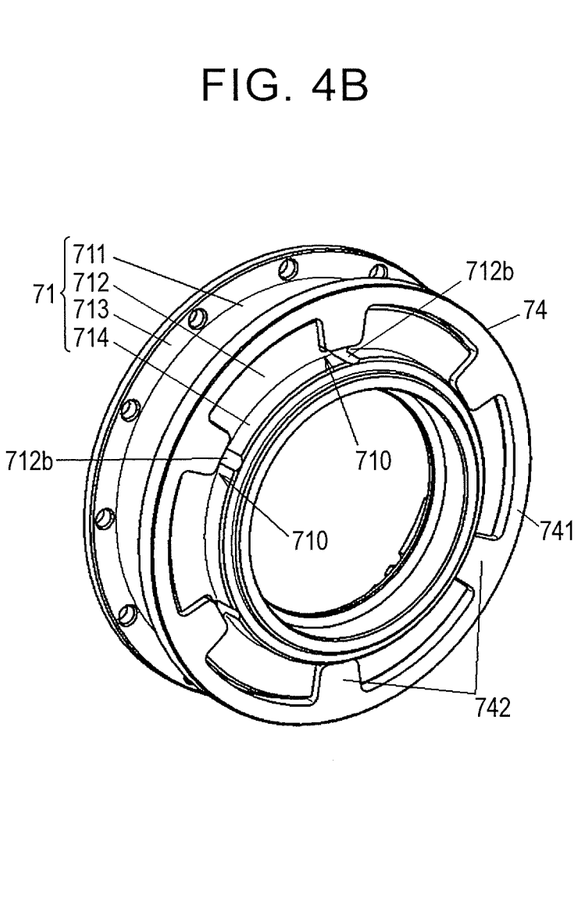
FIG. 4B is a perspective view of the second clutch housing and the second pressing member that are combined together.

FIG. 1 is a sectional view illustrating a configuration example of a vehicle drive device including a clutch device according to the embodiment of the disclosure. FIG. 2 is a partial enlarged sectional view of the vehicle drive device. FIG. 3A is a perspective view of a first clutch housing and a first pressing member that are separated in an axial direction, and FIG. 3B is a perspective view of the first clutch housing and the first pressing member that are combined together. FIG. 4A is a perspective view of a second clutch housing and a second pressing member that are separated in the axial direction, and FIG. 4B is a perspective view of the second clutch housing and the second pressing member that are combined together.

Overall Configuration of Vehicle Drive Device

A vehicle drive device 1 is mounted on a four-wheel drive vehicle in which one of a pair of right and left front wheels and a pair of right and left rear wheels serves as main drive wheels and the other pair as auxiliary drive wheels. The vehicle drive device 1 is used to drive the auxiliary drive wheels (e.g., the right and left rear wheels). The vehicle drive device 1 can change the right-left driving force distribution ratio that is the ratio between the driving force to be transmitted to the left wheel and the driving force to be transmitted to the right wheel. The main drive wheels are driven by a main driving source comprised of, for example, an engine that is an internal combustion engine, a high power electric motor, or a hybrid system that is a combination of the engine and the high power electric motor. For example, the vehicle drive device 1 adjusts the right-left driving force distribution ratio of the auxiliary drive wheels to increase distribution of the driving force to the outer wheel during turning so that driving stability during turning is improved.

The vehicle drive device 1 includes a device case 10, a drive unit 2, a speed reduction mechanism 3, and a clutch device 4. The device case 10 includes first to fifth case members 11 to 15. The drive unit 2 includes an electric motor 21 that serves as an auxiliary driving source for driving the auxiliary drive wheels. The speed reduction mechanism 3 reduces the speed of output rotation of a rotary shaft 211 of the electric motor 21. The clutch device 4 distributes and transmits the driving force of the electric motor 21 reduced in speed by the speed reduction mechanism 3 to the right wheel side and the left wheel side.

The first case member 11 accommodates the speed reduction mechanism 3 and the clutch device 4, and the second case member 12 accommodates the drive unit 2. The first case member 11 and the second case member 12 are fastened by bolts 101. The third case member 13 and the fourth case member 14 close the opening of the second case member 12. The third case member 13 is fastened to the second case member 12 by bolts 102, and the fourth case member 14 is fastened to the third case member 13 by bolts 103. The fifth case member 15 is fastened to the first case member 11 by bolts, not shown, and defines a space accommodating the clutch device 4. Lubricating oil, not shown, is enclosed in the first case member 11.

The clutch device 4 includes a partition wall 5, first clutch unit 6 and second clutch unit 7, a first inner rotary member 8, and a second inner rotary member 9. The first clutch unit 6 and second clutch unit 7 are disposed with the partition wall 5 interposed therebetween. The first inner rotary member 8 is an inner rotary member to which the driving force applied from the speed reduction mechanism 3 is transmitted through the first clutch unit 6. The second inner rotary member 9 is an inner rotary member to which the driving force applied from the speed reduction mechanism 3 is transmitted through the second clutch unit 7.

The first inner rotary member 8 includes a first clutch hub 81 and a first output shaft 82. The first clutch hub 81 and the first output shaft 82 are spline-fitted together and rotate together. The first output shaft 82 has a shaft portion 821 and a flange portion 822. A drive shaft that transmits the driving force to the left wheel is coupled to the flange portion 822 of the first output shaft 82.

As shown in FIG. 2, the first clutch hub 81 includes an outer cylindrical portion 811, an inner cylindrical portion 812, and an annular wall portion 813 provided between the outer cylindrical portion 811 and the inner cylindrical portion 812. The outer cylindrical portion 811 includes a plurality of oil holes 811b. The inner cylindrical portion 812 is coupled to an end of the shaft portion 821 of the first output shaft 82. The first clutch hub 81 and the first output shaft 82 may be provided integrally.

The second inner rotary member 9 includes a second clutch hub 91 and a second output shaft 92. The second clutch hub 91 and the second output shaft 92 are spline-fitted together and rotate together. The second output shaft 92 includes a shaft portion 921 and a flange portion 922. A drive shaft that transmits the driving force to the right wheel is coupled to the flange portion 922 of the second output shaft 92.

As shown in FIG. 2, the second clutch hub 91 includes an outer cylindrical portion 911, an inner cylindrical portion 912, and an annular wall portion 913 provided between the outer cylindrical portion 911 and the inner cylindrical portion 912. The outer cylindrical portion 911 includes a plurality of oil holes 911b. The inner cylindrical portion 912 is coupled to an end of the shaft portion 921 of the second output shaft 92. The second clutch hub 91 and the second output shaft 92 may be provided integrally.

The first inner rotary member 8 and the second inner rotary member 9 rotate relatively to each other about a rotation axis O extending in the lateral direction of the vehicle. A direction parallel to the rotation axis O is hereinafter referred to as the axial direction. A snap ring 44 restricts relative movement in the axial direction between the second clutch hub 91 and the second output shaft 92. A sliding bearing 45 is disposed between the annular wall portion 813 of the first clutch hub 81 and the annular wall portion 913 of the second clutch hub 91.

The drive unit 2 includes the electric motor 21 and a rotation sensor 22 that detects rotation of the rotary shaft 211 of the electric motor 21. The rotation sensor 22 includes a resolver rotor 221 and a resolver sensor 222. The resolver rotor 221 is fixed to the rotary shaft 211, and the resolver sensor 222 is fixed to the third case member 13 with bolts 104. A ball bearing 231 and a seal member 241 are disposed between the fourth case member 14 and the shaft portion 821 of the first output shaft 82.

The electric motor 21 is a three-phase brushless motor and includes a rotor 212 and a stator 213. The rotor 212 rotates with the rotary shaft 211, and the stator 213 is fixed to the second case member 12. The rotor 212 includes a plurality of permanent magnets 212b fixed to the outer peripheral surface of a rotor core 212a. The stator 213 includes a plurality of coils 213b wound in a stator core 213a. A controller, not shown, supplies a motor current corresponding to the rotational position of the rotary shaft 211 detected by the rotation sensor 22 to the coils 213b.

The rotary shaft 211 of the electric motor 21 includes a hollow tubular shape. Ball bearings 232, 233 support the rotary shaft 211 of the electric motor 21 so that the rotary shaft 211 of the electric motor 21 is rotatable with respect to the device case 10. The shaft portion 821 of the first output shaft 82 is inserted through the rotary shaft 211.

The speed reduction mechanism 3 includes a cylindrical pinion gear 31, a reduction gear 32, and a ring gear 33. The cylindrical pinion gear 31 is fitted on an end of the rotary shaft 211 of the electric motor 21. The pinion gear 31 is spline-fitted on the rotary shaft 211 and rotates with the rotary shaft 211. The reduction gear 32 includes a disc-shaped disc portion 321 and a hollow shaft portion 322, the disc portion 321 being provided integrally with the hollow shaft portion 322. The hollow shaft portion 322 is supported in the first case member 11 by bearings 341, 342. A large diameter gear portion 321a is provided on the outer peripheral end of the disc portion 321. The large diameter gear portion 321a meshes with a gear portion 31a provided on the outer periphery of the pinion gear 31. A seal member 242 is disposed on the outer periphery of the pinion gear 31 to control leakage of the lubricating oil enclosed in the first case member 11 toward the drive unit 2.

A small diameter gear portion 322a is provided on the outer periphery of a part of the hollow shaft portion 322 in the axial direction. The small diameter gear portion 322a meshes with a gear portion 33a provided on the outer periphery of the ring gear 33. The ring gear 33 includes an annular inward protrusion 331 having a plurality of threaded holes 330 into which fastening bolts 35 are screwed.

A first bearing 41 is disposed between the fifth case member 15 and the shaft portion 821 of the first output shaft 82. The first bearing 41 supports the first inner rotary member 8 so that the first inner rotary member 8 is rotatable with respect to the device case 10. A second bearing 42 and a seal member 43 are disposed between the first case member 11 and the shaft portion 921 of the second output shaft 92. The second bearing 42 supports the second inner rotary member 9 so that the second inner rotary member 9 is rotatable with respect to the device case 10. The first bearing 41 and second bearing 42 are rolling bearings (ball bearings) having a plurality of rolling elements (balls) arranged between an inner ring and an outer ring.

The first clutch unit 6 includes a first clutch housing 61, a first multiple disc clutch 62, a first rolling bearing 63, a first pressing member 64, an annular piston 65, a thrust roller bearing 66, a washer 67, an annular pressing plate 68, and a return spring 69. The first multiple disc clutch 62 includes a plurality of outer clutch plates 621 and a plurality of inner clutch plates 622. The first rolling bearing 63 supports the first clutch housing 61 so that the first clutch housing 61 is rotatable with respect to the fifth case member 15. The first pressing member 64 presses the first multiple disc clutch 62 in the axial direction. The annular piston 65 receives an oil pressure and applies an axial moving force to the first pressing member 64. The thrust roller bearing 66 and the washer 67 are disposed between the first pressing member 64 and the piston 65. The annular pressing plate 68 is disposed between the first pressing member 64 and the first multiple disc clutch 62. The return spring 69 is a biasing member that biases the first pressing member 64 toward the piston 65.

As shown in FIG. 2 and FIG. 3A and FIG. 3B, the first clutch housing 61 includes a cylindrical portion 611, a bottom 612, a flange portion 613, and a small diameter cylindrical portion 614. The cylindrical portion 611, the bottom 612, the flange portion 613, and the small diameter cylindrical portion 614 are provided integrally. The bottom 612 extends inward in a radial direction from one end of the cylindrical portion 611. The flange portion 613 protrudes outward in the radial direction from the other end of the cylindrical portion 611. The small diameter cylindrical portion 614 extends in the axial direction from the inner peripheral end of the bottom 612. The first multiple disc clutch 62 is accommodated in the cylindrical portion 611. The cylindrical portion 611 has on its inner peripheral surface a plurality of spline protrusions 611a extending in the axial direction.

The outer peripheral ends of the outer clutch plates 621 are engaged with the spline protrusions 611a of the cylindrical portion 611 of the first clutch housing 61. The outer clutch plates 621 are thus movable in the axial direction, but are not rotatable, relative to the first clutch housing 61. In the present embodiment, six outer clutch plates 621 and seven inner clutch plates 622 are alternately arranged in the axial direction. The outer cylindrical portion 811 of the first clutch hub 81 has on its outer peripheral surface a plurality of spline protrusions 811a extending in the axial direction. The inner clutch plates 622 are engaged with the spline protrusions 811a of the outer cylindrical portion 811 of the first clutch hub 81. The inner clutch plates 622 are thus movable in the axial direction, but are not rotatable, relative to the first clutch hub 81.

The first rolling bearing 63 is a tapered roller bearing and includes an outer ring 631, an inner ring 632, a plurality of tapered rollers 633, and a cage 634. The tapered rollers 633 are rolling elements arranged between the outer ring 631 and the inner ring 632. The cage 634 retains the tapered rollers 633.

A cylinder 150 is provided in the fifth case member 15, and the piston 65 applies an axial moving force to the first pressing member 64 according to the pressure of hydraulic oil supplied to the cylinder 150. The controller, not shown, supplies hydraulic oil to the cylinder 150 through a pipe, not shown.

The second clutch unit 7 is disposed next to the first clutch unit 6 in the axial direction and is configured symmetrically with the first clutch unit 6. The second clutch unit 7 includes a second clutch housing 71, a second multiple disc clutch 72, a second rolling bearing 73, a second pressing member 74, an annular piston 75, a thrust roller bearing 76, a washer 77, an annular pressing plate 78, and a return spring 79. The second multiple disc clutch 72 includes a plurality of outer clutch plates 721 and a plurality of inner clutch plates 722. The second rolling bearing 73 supports the second clutch housing 71 so that the second clutch housing 71 is rotatable with respect to the first case member 11. The second pressing member 74 presses the second multiple disc clutch 72 in the axial direction. The piston 75 receives an oil pressure and applies an axial moving force to the second pressing member 74. The thrust roller bearing 76 and the washer 77 are disposed between the second pressing member 74 and the piston 75. The annular pressing plate 78 is disposed between the second pressing member 74 and the second multiple disc clutch 72. The return spring 79 is a biasing member that biases the second pressing member 74 toward the piston 75.

A cylinder 110 is provided in the first case member 11, and the piston 75 applies an axial moving force to the second pressing member 74 according to the pressure of hydraulic oil supplied to the cylinder 110. The controller, not shown, supplies hydraulic oil to the cylinder 110 through a pipe, not shown.

Since the detailed configuration of the members and portions of the second clutch unit 7 is similar to that of the first clutch unit 6, the members and portions of the second clutch unit 7 are denoted with reference characters corresponding to those of the members and portions of the first clutch unit 6 described above, and repetitive description will be omitted. Specifically, in FIGS. 1 to 4, "6," which is the first number of each reference character indicating the members and portions of the first clutch unit 6, is replaced with "7" in each reference character indicating the members and portions of the second clutch unit 7.

The partition wall 5 includes a first end plate 51, a second end plate 52, and a spacer 53. The first end plate 51 abuts on the flange portion 613 of the first clutch housing 61, the second end plate 52 abuts on a flange portion 713 of the second clutch housing 71, and the spacer 53 is disposed between the first end plate 51 and the second end plate 52. The fastening bolts 35 pass through the flange portions 613, 713 of the first clutch housing 61 and second clutch housing 71, the first end plate 51, the second end plate 52, and the spacer 53 and are tightened into the threaded holes 330 of the ring gear 33. The partition wall 5 is thus fixed to the first clutch housing 61 and second clutch housing 71 so as not to be movable in the axial direction, and the first clutch housing 61 and second clutch housing 71 rotate with the partition wall 5.

The first end plate 51 is attached to an open end of the first clutch housing 61 and functions as a receiving member that receives the pressing force of the first pressing member 64 through the first multiple disc clutch 62. The first pressing member 64 moves in the axial direction with respect to the first clutch housing 61 to press the first multiple disc clutch 62 from the bottom 612 side toward the first end plate 51 side. The outer clutch plates 621 and the inner clutch plates 622 are thus brought into frictional contact with each other, so that the driving force (torque) is transmitted between the first clutch housing 61 and the first clutch hub 81.

The second end plate 52 is attached to an open end of the second clutch housing 71 and functions as a receiving member that receives the pressing force of the second pressing member 74 through the second multiple disc clutch 72. The second pressing member 74 moves in the axial direction with respect to the second clutch housing 71 to press the second multiple disc clutch 72 from the bottom 712 side toward the second end plate 52 side. The outer clutch plates 721 and the inner clutch plates 722 are thus brought into frictional contact with each other, so that the driving force (torque) is transmitted between the second clutch housing 71 and the second clutch hub 91. The outer clutch plates 721 are engaged with a plurality of spline protrusions 711a of a cylindrical portion 711 of the second clutch housing 71. The outer cylindrical portion 911 of the second clutch hub 91 has on its outer peripheral surface a plurality of spline protrusions 911a extending in the axial direction. The inner clutch plates 722 are engaged with the plurality of spline protrusions 911a.

The first rolling bearing 63 and second rolling bearing 73 restrict axial movement of the first clutch housing 61 and second clutch housing 71. The pressing force of the first pressing member 64 is transmitted from the partition wall 5 to the second clutch housing 71 and is received by the second rolling bearing 73. The pressing force of the second pressing member 74 is transmitted from the partition wall 5 to the first clutch housing 61 and is received by the first rolling bearing 63. The driving force that is transmitted to the first inner rotary member 8 and the driving force that is transmitted to the second inner rotary member 9 can thus be controlled independently.

The first pressing member 64 is a one-piece member including an annular portion 641 and a plurality of protruding portions 642. The annular portion 641 is disposed radially outward of the bottom 612 of the first clutch housing 61. The protruding portions 642 protrude inward in the radial direction from the annular portion 641. The first pressing member 64 has a flat plate shape and includes the annular portion 641 and the protruding portions 642 provided such that a thickness of the annular portion 641 and a thickness of each of the protruding portions 642 are equal to each other, and the annular portion 641 and the protruding portions 642 constitute an integral (one-piece) unit (in other words, the annular portion 641 is formed integrally (provided integrally) with the protruding portions 642, that is, the annular portion 641 is integral with the protruding portions 642). In the present embodiment, the first pressing member 64 has six protruding portions 642 at equal intervals in the circumferential direction. The annular portion 641 and the protruding portions 642 are thicker than the bottom 612.

Similarly, the second pressing member 74 is a one-piece member including an annular portion 741 and a plurality of protruding portions 742. The annular portion 741 is disposed radially outward of the bottom 712 of the second clutch housing 71. The protruding portions 742 protrude inward in the radial direction from the annular portion 741. The second pressing member 74 has a flat plate shape and includes the annular portion 741 and the protruding portions 742 provided such that a thickness of the annular portion 741 and a thickness of each of the protruding portions 742 are equal to each other and the annular portion 741 and the protruding portions 742 constitute an integral (one-piece) unit (in other words, the annular portion 741 is formed integrally (provided integrally) with the protruding portions 742, that is, the annular portion 741 is integral with the protruding portions 742). In the present embodiment, the second pressing member 74 has six protruding portions 742 at equal intervals in the circumferential direction. The annular portion 741 and the protruding portions 742 are thicker than the bottom 712.

Each of the first pressing member 64 and the second pressing member 74 is a one-piece member produced by, for example, punching a steel sheet. As used herein, the "one-piece member" does not refer to a combination of a plurality of parts but refers to an integral member. The return spring 69 is disposed in an axially compressed state between the inward protrusion 331 of the ring gear 33 and the annular portion 641 of the first pressing member 64. The return spring 79 is disposed in an axially compressed state between the annular portion 741 of the second pressing member 74 and the flange portion 713 of the second clutch housing 71.

The first clutch housing 61 includes a plurality of cutouts 610 that are provided in the outer peripheral end of the bottom 612 and the end on the bottom 612 side of the cylindrical portion 611. The cutouts 610 accommodate the respective protruding portions 642. Each cutout 610 includes a cutout 612a in the bottom 612 and a cutout 611b in the cylindrical portion 611. The cutout 612a extends through the bottom 612 in the axial direction, and the cutout 611b extends through the cylindrical portion 611 in the radial direction. The protruding portions 642 move in the axial direction within the cutouts 610 to press the first multiple disc clutch 62. The cutouts 611b in the cylindrical portion 611 are provided such that the cutouts 611b do not hinder the first pressing member 64 from moving in the axial direction when pressing the first multiple disc clutch 62.

Similarly, the second clutch housing 71 includes a plurality of cutouts 710 that are provided in the outer peripheral end of the bottom 712 and the end on the bottom 712 side of the cylindrical portion 711. The cutouts 710 accommodate the protruding portions 742. Each cutout 710 includes a cutout 712a in the bottom 712 and a cutout 711b in the cylindrical portion 711. The cutout 712a extends through the bottom 712 in the axial direction, and the cutout 711b extends through the cylindrical portion 711 in the radial direction. The protruding portions 742 move in the axial direction within the cutouts 710 to press the second multiple disc clutch 72. The cutouts 711b in the cylindrical portion 711 are provided such that the cutouts 711b do not hinder the second pressing member 74 from moving in the axial direction when pressing the second multiple disc clutch 72.

Since the protruding portions 642 are engaged with the respective cutouts 610, the first pressing member 64 is restricted from rotating relative to the first clutch housing 61, and rotates with the first clutch housing 61. Similarly, since the protruding portions 742 are engaged with the cutouts 710, the second pressing member 74 is restricted from rotating relative to the second clutch housing 71, and rotates with the second clutch housing 71.

In the present embodiment, as shown in FIG. 3A and FIG. 3B, the first clutch housing 61 includes oil grooves 612b. The oil grooves 612b communicate with the cutouts 612a in the bottom 612 of the first clutch housing 61 to allow lubricating oil to flow smoothly when the first pressing member 64 moves in the axial direction. Similarly, the second clutch housing 71 includes oil grooves 712b. The oil grooves 712b communicate with the cutouts 712a in the bottom 712 of the second clutch housing 71 to allow lubricating oil to flow smoothly when the second pressing member 74 moves in the axial direction.

In the clutch device 4 configured as described above, when the controller supplies hydraulic oil to the cylinder 150, the first pressing member 64 presses the first multiple disc clutch 62, and the driving force of the drive unit 2 is transmitted to the first inner rotary member 8. When the controller supplies hydraulic oil to the cylinder 110, the second pressing member 74 presses the second multiple disc clutch 72, and the driving force of the drive unit 2 is transmitted to the second inner rotary member 9. The controller uses, for example, an solenoid valve to adjust the pressures of hydraulic oil to be supplied to the cylinders 150, 110, thereby controlling the driving force to be transmitted from the first inner rotary member 8 to the left wheel through the left drive shaft and the driving force to be transmitted from the second inner rotary member 9 to the right wheel through the right drive shaft.

Functions and Effects of First Embodiments

According to the first embodiment described above, the annular portion 641 of the first pressing member 64 is disposed radially outward of the bottom 612 of the first clutch housing 61, and the protruding portions 642 protruding inward in the radial direction from the annular portion 641 presses the first multiple disc clutch 62. Similarly, the annular portion 741 of the second pressing member 74 is disposed radially outward of the bottom 712 of the second clutch housing 71, and the protruding portions 742 protruding inward in the radial direction from the annular portion 741 press the second multiple disc clutch 72. With this configuration, the first pressing member 64 and second pressing member 74 have a flat plate shape with no protrusions etc. protruding in the axial direction. The first pressing member 64 and second pressing member 74 can thus be easily formed by, for example, punching a steel sheet. Reduction in cost for the clutch device 4 is thus achieved.

Modification of First Embodiment

Figure 5:
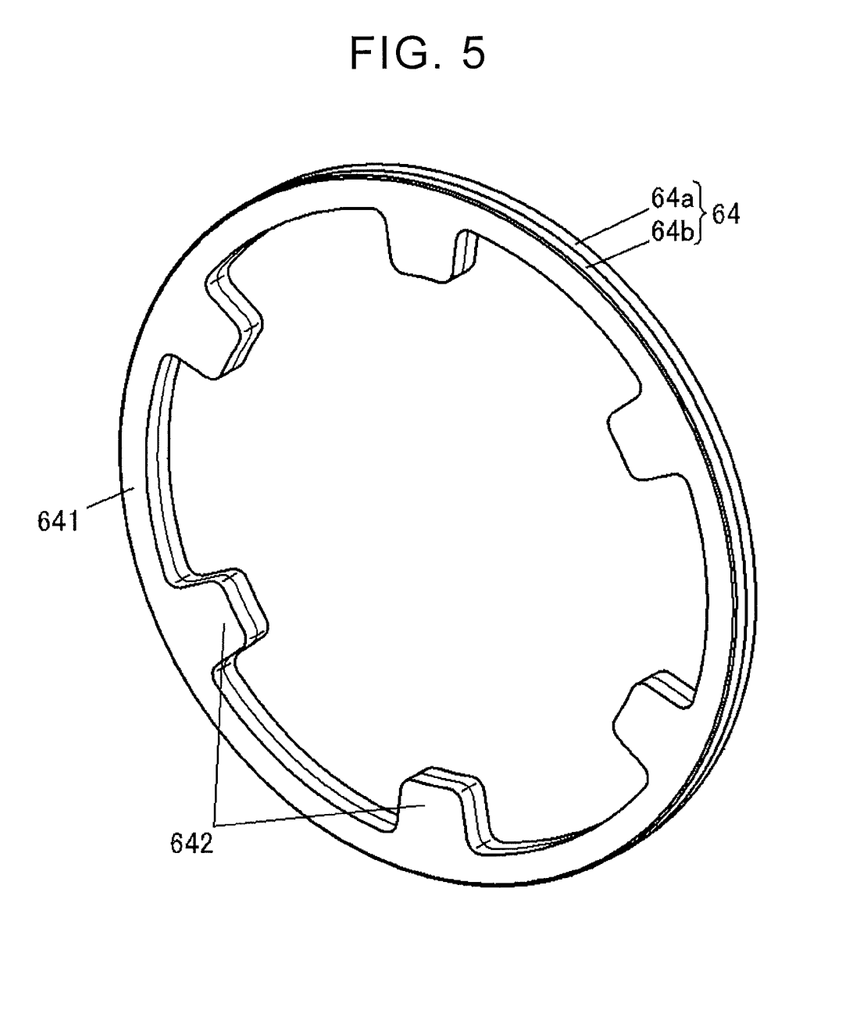
FIG. 5 is a perspective view of a first pressing member according to a modification of the first embodiment.

FIG. 5 is a perspective view of a first pressing member 64 according to a modification of the first embodiment. The first embodiment is described with respect to the case where the first pressing member 64 is a one-piece member. In the modification shown in FIG. 5, the first pressing member 64 includes a plurality of plate members 64a, 64b stacked in the axial direction. The plate members 64a, 64b have a flat plate shape, and the shape and thickness of the plate member 64a are the same as those of the plate member 64b. The plate members 64a, 64b are joined to form a single component. The plate members 64a, 64b may be joined by, for example, welding or clinching.

In the first pressing member 64 configured in this manner, each plate member 64a, 64b has a small thickness, which facilitates machining, and the first pressing member 64 has a sufficient overall thickness. This configuration can also increase the distance by which the first pressing member 64 moves in the axial direction with respect to the first clutch housing 61. The number of plate members that are stacked in the axial direction is not limited to two, and three or more plate members may be stacked in the axial direction. The second pressing member 74 can also be configured similarly to the first pressing member 64.

Second Embodiment

Figure 6:
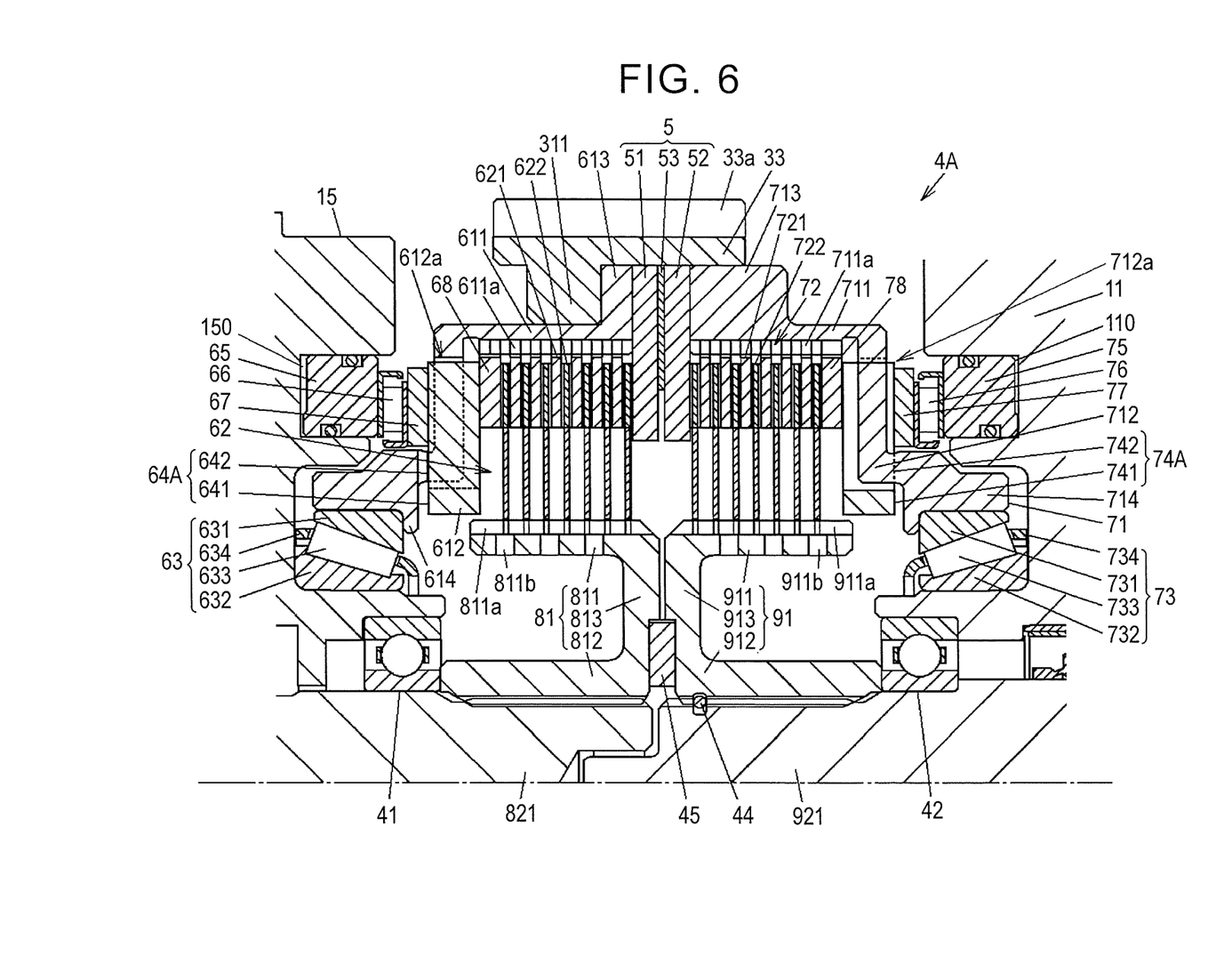
FIG. 6 is a partial enlarged sectional view of a vehicle drive device according to a second embodiment of the disclosure.
Figure 7:
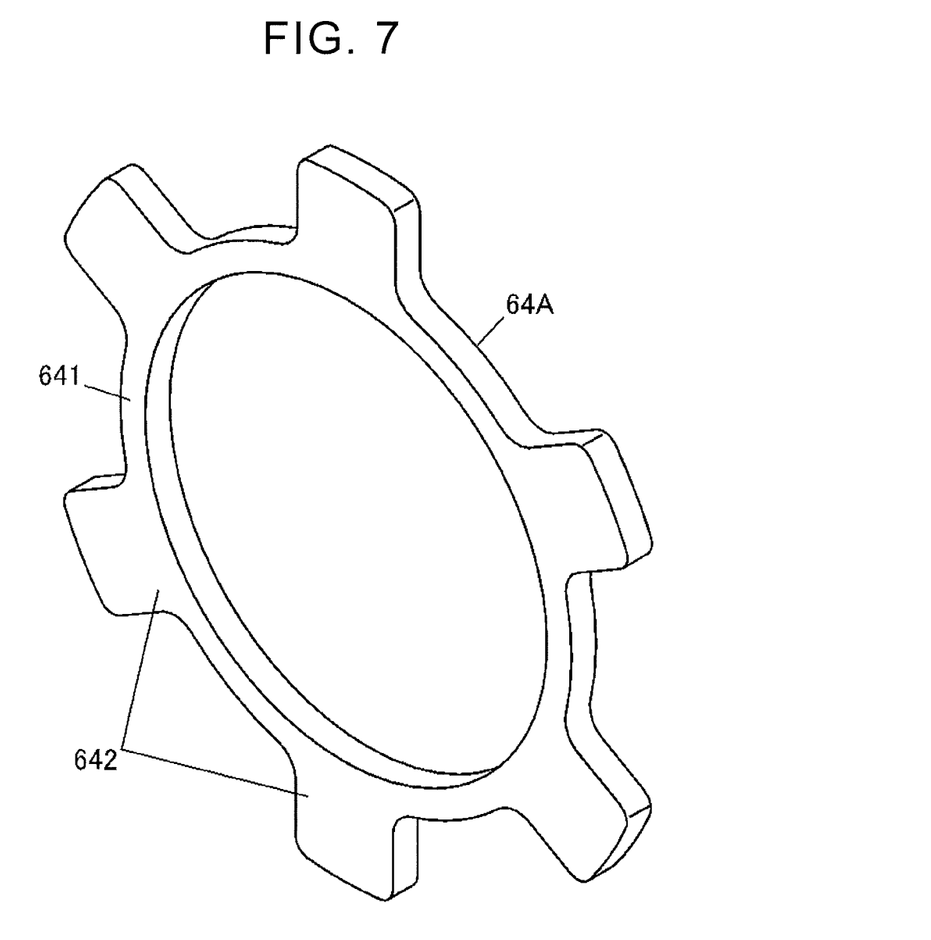
FIG. 7 is a perspective view of a first pressing member according to the second embodiment.

A second embodiment of the disclosure will be described with reference to FIGS. 6 and 7. FIG. 6 is a sectional view of a clutch device 4A according to the second embodiment. FIG. 7 is a perspective view of a first pressing member 64A of the clutch device 4A. In FIGS. 6 and 7, the same components as those described in the first embodiment are denoted with the same reference characters as those used in FIGS. 1 to 4, and repetitive description will be omitted.

Similar to the first pressing member 64 according to the first embodiment, the first pressing member 64A according to the present embodiment includes an annular portion 641 and a plurality of protruding portions 642, and the annular portion 641 is provided integrally with the protruding portions 642. In the present embodiment, however, the protruding portions 642 protrude outward in the radial direction from the annular portion 641. The annular portion 641 of the first pressing member 64A is disposed radially inward of the bottom 612 of the first clutch housing 61. A second pressing member 74A of the second clutch unit 7 is configured similar to that of the first pressing member 64A.

In the present embodiment, the cutouts 612a in the bottom 612 of the first clutch housing 61 which accommodate the protruding portions 642 of the first pressing member 64A are provided in the inner peripheral end of the bottom 612. The cutouts 612a are open to the inner peripheral surface of the bottom 612. Since the protruding portions 642 are engaged with the respective cutouts 612a in the bottom 612, the first pressing member 64A is restricted from rotating relative to the first clutch housing 61 and presses the first multiple disc clutch 62 by the protruding portions 642. The second pressing member 74A is configured similarly to the first pressing member 64A.

The second embodiment described above has the same functions and effects as those of the first embodiment. As in the modification of the first embodiment, each of the first pressing member 64A and the second pressing member 74A may include a plurality of plate members stacked in the axial direction.

Additional Notes

The disclosure is described above based on the first and second embodiments and their modifications. However, these embodiments and modifications are not intended to limit the disclosure as defined in the claims. It should be understood that not all of the combinations of the features described in the embodiments are essential to solve the problems by the disclosure.

The disclosure may be modified as appropriate without departing from the spirit and scope of the disclosure. For example, the above embodiment is described with respect to the case where the clutch device 4 is applied to the vehicle drive device 1. However, the disclosure is not limited to the clutch device 4 for the vehicle drive device 1 and is applicable to clutch devices for various applications.

What is claimed is:

1. A clutch device, comprising:
   a clutch housing including a cylindrical portion and a bottom extending inward in a radial direction from one end of the cylindrical portion;
   a multiple disc clutch including a plurality of clutch plates accommodated in the cylindrical portion;
   a receiving member attached to an open end of the clutch housing; and
   a pressing member that moves in an axial direction with respect to the clutch housing to press the multiple disc clutch from the bottom side toward the receiving member, wherein
   the pressing member has a flat plate shape and includes an annular portion disposed radially inward or outward of the bottom and a plurality of protruding portions protruding in the radial direction from the annular portion, the annular portion being provided integrally with the protruding portions, the bottom of the clutch housing includes a plurality of cutouts that accommodate the protruding portions, and the protruding portions move in the axial direction within the cutouts to press the multiple disc clutch.

2. The clutch device according to claim 1, wherein
   the annular portion is disposed radially outward of the bottom of the clutch housing, the protruding portions protrude inward in the radial direction from the annular portion, and the cutouts are provided in an outer peripheral end of the bottom and an end on the bottom side of the cylindrical portion.

3. The clutch device according to claim 1, wherein
   the annular portion is disposed radially inward of the bottom of the clutch housing, the protruding portions protrude outward in the radial direction from the annular portion, and the cutouts are provided in an inner peripheral end of the bottom.

4. The clutch device according to claim 1, wherein
   a thickness of the annular portion and a thickness of each of the protruding portions are equal to each other and the annular portion and the protruding portions constitute an integral unit.

5. The clutch device according to claim 1, wherein
   the pressing member includes a plurality of plate members stacked in the axial direction.

6. A clutch device, comprising:
   a clutch housing including a cylindrical portion and a bottom extending inward in a radial direction from one end of the cylindrical portion;
   a multiple disc clutch including a plurality of clutch plates accommodated in the cylindrical portion;
   a receiving member attached to an open end of the clutch housing; and
   a pressing member that moves in an axial direction with respect to the clutch housing to press the multiple disc clutch from the bottom side toward the receiving member, wherein
   the pressing member includes an annular portion disposed radially inward or outward of the bottom and a plurality of protruding portions protruding in the radial direction from the annular portion, the annular portion being provided integrally with the protruding portions, the bottom of the clutch housing includes a plurality of cutouts that accommodate the protruding portions, and the protruding portions move in the axial direction within the cutouts to press the multiple disc clutch, and
   the annular portion is disposed radially outward of the bottom of the clutch housing, the protruding portions protrude inward in the radial direction from the annular portion, and the cutouts are provided in an outer peripheral end of the bottom and an end on the bottom side of the cylindrical portion.

* * * * *